United States Patent [19]

Kihara et al.

[11] Patent Number: 5,783,646
[45] Date of Patent: Jul. 21, 1998

[54] PROCESS FOR PRODUCING STYRENE BASE POLYMER

[75] Inventors: Hayato Kihara; Masayuki Fujita, both of Ichihara, Japan

[73] Assignee: Sumitomo Chemical Company, Limited, Osaka, Japan

[21] Appl. No.: 899,641

[22] Filed: Jul. 24, 1997

Related U.S. Application Data

[63] Continuation of Ser. No. 747,668, Nov. 12, 1996, abandoned.

[30] Foreign Application Priority Data

Nov. 10, 1995  [JP]  Japan .................................. 7-292741
Nov. 10, 1995  [JP]  Japan .................................. 7-292741

[51] Int. Cl.$^6$ .............................. C08F 2/00; C08F 12/08
[52] U.S. Cl. ..................... 526/204; 526/217; 526/219; 526/220; 526/346
[58] Field of Search .............................. 526/204, 217, 526/219, 220, 346

[56] References Cited

U.S. PATENT DOCUMENTS

| | | | |
|---|---|---|---|
| 5,115,055 | 5/1992 | Dias et al. | 526/346 X |
| 5,115,066 | 5/1992 | Zimmermann et al. | 526/346 |
| 5,322,912 | 6/1994 | Georges et al. | 526/204 |
| 5,401,804 | 3/1995 | Georges et al. | |
| 5,549,998 | 8/1996 | Georges et al. | |

FOREIGN PATENT DOCUMENTS

| | | |
|---|---|---|
| 6199916 | 7/1994 | Japan . |
| 9411412 | 5/1994 | WIPO . |
| 9413705 | 6/1994 | WIPO . |
| 9613527 | 5/1996 | WIPO . |

OTHER PUBLICATIONS

J.M.S.–Pure Appl. Chem., A31(11), pp. 1561–1578 (1994) "Controlled Radical Polymerization".

*Primary Examiner*—Fred Teskin
*Attorney, Agent, or Firm*—Stevens, Davis, Miller & Mosher, L.L.P.

[57] ABSTRACT

A styrene base polymer superior and well-balanced in mechanical strength and fluidity and also superior in heat resistance is industrially advantageously produced by a radical polymerization process comprising;

(a) subjecting styrene or a styrene compound and a radical scavenger to thermal polymerization, (1) a concentration of the radical scavenger to styrene or the styrene compound being from $3.0 \times 10^{-3}$ to $5.0 \times 10^{-2}$ mol %, and (2) a polymerization temperature ranging from 100° C. to 140° C., provided that the concentration of the radical scavenger (C) and the polymerization temperature (T) satisfy the following formula, $$100C + 0.088T \leq 13.8,$$

and (b) continuing the polymerization to a polymerization conversion of from 40 to 85%.

6 Claims, No Drawings

PROCESS FOR PRODUCING STYRENE BASE POLYMER

This application is a continuing application of Ser. No. 08/747,668, filed Nov. 12, 1996, now abandoned.

The present invention relates to a process for producing a styrene base polymer. More particularly, it relates to a radical polymerization process for producing a styrene base polymer having a narrow molecular weight distribution, which is improved and well balanced in fluidity and mechanical strength, and is also superior in heat resistance.

Styrene base polymers produced by a conventional radical polymerization process have been used for various molding applications because of excellence in rigidity and dimensional stability as well as low prices. However, in an injection molding, lightening of a molded article particularly for a large-sized one has been required. In order to lighten the molded article, it is effective to reduce a wall thickness thereof. Thus, the polymers have been required to have an improved mechanical strength.

As known, the mechanical strength can be improved by increasing a molecular weight of the polymers. However, this results in deterioration of the fluidity, so that a short shot arises on molding, or if the polymers are daringly molded, a residual strain becomes high due to high flow shear, thereby deteriorating the mechanical strength of the molded article.

On the other hand, the fluidity can be improved by incorporating a plasticizer such as mineral oil into the polymers without decreasing the molecular weight of the polymers. However, the incorporation of the plasticizer results in deterioration of not only the mechanical strength but also heat resistance of the polymers.

According to Flory et al., the mechanical strength can be improved by increasing the number average molecular weight (Mn). While, it is desired to decrease the weight average molecular weight (Mw) to improve the fluidity. Considering the relation between Mn and Mw being expressed by $Mn \leq Mw$, it is desired to narrow the molecular weight distribution (Mw/Mn) to simultaneously satisfy high fluidity and high mechanical strength.

An anionic polymerization is known for narrowing the molecular weight distribution. However, it is not advantageous from an industrial point of view, because it requires severe polymerization conditions to rise a production cost and moreover coloring of polymers easily occurs due to the residual catalyst.

Japanese Patent Kokai (Laid-Open) No. 6-199916 discloses a production of a thermoplastic resin having a narrow molecular weight distribution by a free radical polymerization, wherein a free radical initiator and a stable free radical agent are mixed with a monomer compound to be polymerized and the resulting mixture is heated at 100° to 160° C. According to this free radical polymerization, the weight average molecular weight of the polymer obtained is at most from 10,000 to 67,000, so that the mechanical strength is insufficient for applications such as injection molding, extrusion molding and foam molding.

An object of the present invention is to provide a process for producing a styrene base polymer superior and well-balanced in mechanical strength and fluidity and also superior in heat resistance.

Another object of the present invention is to provide an industrially advantageous process for producing a styrene base polymer capable of giving a thin-wall and light-weight injection-molded article and also giving a molded article having high mechanical strength while maintaining a productivity of an extrusion molding and a foam molding at a satisfactory level.

Other objects and advantages of the present invention will be apparent from the ensuing description and appended claims.

The present invention provides a radical polymerization process for producing a styrene base polymer, which comprises;

(a) subjecting styrene or a styrene compound and a radical scavenger optionally with a compound copolymerizable with styrene or the styrene compound to thermal polymerization, (1) a concentration of the radical scavenger to styrene or the styrene compound being from $3.0 \times 10^{-3}$ to $5.0 \times 10^{-2}$ mol %, and (2) a polymerization temperature ranging from 100° C. to 140° C., provided that the concentration of the radical scavenger (C) and the polymerization temperature (T) satisfy the following formula, $$100C + 0.088T \leq 13.8,$$

and (b) continuing the polymerization to a polymerization conversion of from 40 to 85%, whereby a styrene base polymer having a weight average molecular weight (Mw) of about 200,000 to about 500,000, a number average molecular weight (Mn) of about 100,000 to about 450,000, and a molecular weight distribution (Mw/Mn) of from 1.1 to 2 can be obtained.

In carrying out the process of the present invention, styrene or a styrene compound is used to obtain a desired styrene base polymer.

The styrene compound used in the present invention includes, for example, α-substituted styrenes such as α-methylstyrene, nuclear-substituted styrenes such as p-methylstyrene, etc.

In the process of the present invention, compounds copolymerizable with styrene or the styrene compound, such as, for example, vinyl monomers including acrylonitrile, methacrylonitrile, methacrylic acid and acrylic acid, and esters such as methyl methacrylate and methyl acrylate, and maleic anhydride, maleimide, nuclear-substituted maleimide, and the like can be used in combination with styrene or the styrene compound. Furthermore, a multifunctional monomer such as divinylbenzene may be used in combination therewith.

The radical scavenger used in the present invention can be any compound capable of easily bonding with and dissociating from a growing radical of the polymer to maintain an equilibrium state.

Examples of the radical scavenger used include 2,2,6,6-tetramethyl-1-piperidinyloxy (hereinafter referred to as "TEMPO"), 4-amino-TEMPO, 4-hydroxy-TEMPO, 4-oxo-TEMPO and other TEMPO compounds; 4,4-dimethyl-3-oxazolinyloxy or a derivative thereof; 2,2,5,5-tetramethyl-1-pyrrolidinyloxy or a derivative thereof; and other stable free radical agents such as phenyl-t-butyl nitroxide, 2,2-di (4-t-octylphenyl)-1-picrylhydrazyl (DPPH), etc.

Among them, 2,2,6,6-tetramethyl-1-piperidinyloxy (TEMPO) is preferred.

The radical scavenger may be used in a mixture prepared by mixing with styrene or the styrene compound prior to the polymerization, or may be added separately to the polymerization reaction zone.

In the present invention, the concentration of the radical scavenger is expressed in terms of a percentage value of a number obtained by dividing the number of mols of a radical scavenger to be used for the polymerization by that of styrene or the styrene compound to be used for the polymerization.

The concentration is from $3.0 \times 10^{-3}$ to $5.0 \times 10^{-2}$ mol %, preferably from $3.0 \times 10^{-3}$ to $4.0 \times 10^{-2}$ mol %, more preferably from $3.0 \times 10^{-3}$ to $3.7 \times 10^{-2}$ mol %.

When the concentration is too low, the molecular weight distribution of the resulting polymer becomes wide to result in deterioration of the mechanical strength. On the other hand, too high concentration results in low polymerization rate and low productivity, and moreover the molecular weight of the resulting polymer is lowered to deteriorate the mechanical strength.

The present radical polymerization is carried out at a temperature of from 100° to 140° C., more preferably from 110° to 140° C.

The concentration of the radical scavenger C and the polymerization temperature T satisfy the following formula:

$$100C + 0.088T \leq 13.8$$

When (100C+0.088T) is too large, the molecular weight of the resulting polymer is lowered to deteriorate the mechanical strength.

The polymerization is continued to a polymerization conversion of from 40 to 85%.

When the polymerization conversion is less than 40%, only a polymer having a low molecular weight is obtained. On the other hand, when the polymerization conversion exceeds 85%, the polymerization rate is lowered to decrease the productivity.

The polymerization of the present invention can be carried out in a manner of a batchwise process or a continuous bulk process in conventional manners.

A polymerization vessel usable can be any vessel and includes complete mixing type stirring polymerization vessel, plug-flow type full flood type (vertical or horizontal type) polymerization vessel, static mixing tube type polymerization vessel and the like. It is preferred to select therefrom a vessel having a small residence time distribution. Too large residence time distribution sometimes results in a wide molecular weight distribution. If desired, the vessels can be used in combination of them, which are selected not so as to enlarge the residence time distribution.

In the present invention, there can be optionally used diluents (e.g. ethylbenzene, etc.), lubricants, antistatic agents, antioxidants, heat stabilizers, ultraviolet absorbers, pigments, dyes and plasticizers (e.g. mineral oil, etc.) together with styrene or the styrene compound.

In accordance with the process of the present invention, there can be obtained styrene base polymers having a weight average molecular weight (Mw) of about 200,000 to about 500,000, preferably about 230,000 to about 450,000, a number average molecular weight (Mn) of about 100,000 to about 450,000, preferably about 130,000 to about 400,000, and a molecular weight distribution (Mw/Mn) of 1.1 to 2, preferably 1.1 to 1.9, more preferably 1.1 to 1.8.

Those too low in the number average molecular weight are inferior in mechanical strength. On the other hand, those too high in the weight average molecular weight is inferior in fluidity. And those having too wide molecular weight distribution are low in the mechanical strength. It is difficult to obtain those having very narrow distribution such as less than 1.1.

The styrene base polymers obtained can be used for applications such as injection molding, extrusion molding, foam molding and the like, thereby giving a thin-wall and light-weight injection-molded article and also giving a molded article having high mechanical strength while maintaining a productivity of an extrusion molding and a foam molding at a satisfactory level.

The present invention is illustrated in more detail with reference to the following Examples and Comparative Examples, which are only illustrative and not limitative.

The measuring methods used in Examples and Comparative Examples are as follows.

(1) Weight average molecular weight (Mw), number average molecular weight (Mn) and molecular weight distribution (Mw/Mn)

A sample to be measured was dissolved in a solvent, tetrahydrofuran to prepare a solution of a sample concentration of about 0.5 mg/ml, and then the solution was subjected to gel permeation chromatography (GPC) equipped with a differential refractometer as a detector. The weight average molecular weight (Mw), number average molecular weight (Mn) and molecular weight distribution (Mw/Mn) were respectively calculated by a calibration curve determined using a monodisperse polystyrene.

(2) Polymerization conversion

A sample (0.5 g) obtained by the polymerization was precisely weighed and dissolved in methyl ethyl ketone to prepare a solution. The resulting solution was added dropwise in an excess methanol to form precipitate, which was separated by filtration, and dried under vacuum at 70° C. for 2 hours. A percentage value of the number obtained by dividing a weight of the precipitate dried by the sample weight(0.5 g) was taken as a polymerization conversion.

(3) Polymerization rate

A value obtained by dividing the polymerization conversion obtained above by a polymerization time was taken as a polymerization rate.

EXAMPLES 1 to 6

Respective polymerizations were carried out under conditions as shown in Tables 1 to 3 using styrene as a monomer, and 2,2,6,6-tetramethyl-1-piperidinyloxy (TEMPO) as a radical scavenger,and the results were also as shown in Tables 1 to 3.

TABLE 1

|  | Example 1 | Example 2 |
|---|---|---|
| Radical scavenger | TEMPO | TEMPO |
| Concentration of radical scavenger C (mol %) | $1.33 \times 10^{-2}$ | $1.33 \times 10^{-2}$ |
| Polymerization temperature T (°C.) | 110 | 130 |
| 100 C. + 0.088T | 11.0 | 12.8 |
| Polymerization time (hour) | 18 | 6 |
| Polymerization conversion (%) | 73 | 76 |
| Weight-average molecular weight Mw ($\times 10^4$) | 33 | 22 |
| Number-average molecular weight Mn ($\times 10^4$) | 20 | 13 |
| Molecular weight distribution (Mw/Mn) | 1.65 | 1.69 |
| Polymerization rate (%/hour) | 4.1 | 12.7 |

TABLE 2

|  | Example 3 | Example 4 |
|---|---|---|
| Radical scavenger | TEMPO | TEMPO |
| Concentration of radical scavenger C (mol %) | $2.00 \times 10^{-2}$ | $2.67 \times 10^{-2}$ |
| Polymerization temperature T (°C.) | 130 | 120 |

TABLE 2-continued

|  | Example 3 | Example 4 |
|---|---|---|
| 100 C. + 0.088T | 13.4 | 13.2 |
| Polymerization time (hour) | 6 | 15 |
| Polymerization conversion (%) | 75 | 80 |
| Weight-average molecular weight Mw (×10⁴) | 21 | 22 |
| Number-average molecular weight Mn (×10⁴) | 12 | 13 |
| Molecular weight distribution (Mw/Mn) | 1.75 | 1.69 |
| Polymerization rate (%/hour) | 12.5 | 5.3 |

TABLE 3

|  | Example 5 | Example 6 |
|---|---|---|
| Radical scavenger | TEMPO | TEMPO |
| Concentration of radical scavenger C (mol %) | 4.00 × 10⁻² | 1.33 × 10⁻² |
| Polymerization temperature T (°C.) | 110 | 140 |
| 100 C. + 0.088T | 12.4 | 13.7 |
| Polymerization time (hour) | 15 | 4 |
| Polymerization conversion (%) | 61 | 78 |
| Weight-average molecular weight Mw (×10⁴) | 22 | 21 |
| Number-average molecular weight Mn (×10⁴) | 14 | 12 |
| Molecular weight distribution (Mw/Mn) | 1.57 | 1.75 |
| Polymerization rate (%/hour) | 4.1 | 1.95 |

Comparative Examples 1 to 7

Respective polymerizations were carried out under conditions as shown in Tables 4 to 7 using styrene as a monomer, and 2,2,6,6-tetramethyl-1-piperidinyloxy (TEMPO) as a radical scavenger when used, and the results were also as shown in Tables 4 to 7.

TABLE 4

|  | Comparative Example 1 | Comparative Example 2 |
|---|---|---|
| Radical scavenger | None | TEMPO |
| Concentration of radical scavenger C (mol %) | 0 | 2.67 × 10⁻² |
| Polymerization temperature T (°C.) | 130 | 130 |
| 100 C. + 0.088T | 11.4 | 14.1 |
| Polymerization time (hour) | 6 | 6 |
| Polymerization conversion (%) | 76 | 78 |
| Weight-average molecular weight Mw (×10⁴) | 33 | 17 |
| Number-average molecular weight Mn (×10⁴) | 16 | 9 |
| Molecular weight distribution (Mw/Mn) | 2.06 | 1.89 |
| Polymerization rate (%/hour) | 12.7 | 13.0 |

TABLE 5

|  | Comparative Example 3 | Comparative Example 4 |
|---|---|---|
| Radical scavenger | TEMPO | TEMPO |
| Concentration of radical scavenger C (mol %) | 4.00 × 10⁻² | 6.67 × 10⁻² |
| Polymerization temperature T (°C.) | 120 | 110 |
| 100 C. + 0.088T | 14.6 | 16.4 |
| Polymerization time (hour) | 18 | 30 |
| Polymerization conversion (%) | 82 | 78 |
| Weight-average molecular weight Mw (×10⁴) | 17 | 13 |

TABLE 5-continued

|  | Comparative Example 3 | Comparative Example 4 |
|---|---|---|
| Number-average molecular weight Mn (×10⁴) | 11 | 10 |
| Molecular weight distribution (Mw/Mn) | 1.55 | 1.30 |
| Polymerization rate (%/hour) | 4.6 | 2.6 |

TABLE 6

|  | Comparative Example 5 |
|---|---|
| Radical scavenger | TEMPO |
| Concentration of radical scavenger C (mol %) | 1.33 × 10⁻² |
| Polymerization temperature T (°C.) | 160 |
| 100 C. + 0.088T | 15.4 |
| Polymerization time (hour) | 5 |
| Polymerization conversion (%) | 89 |
| Weight-average molecular weight Mw (×10⁴) | 12 |
| Number-average molecular weight Mn (×10⁴) | 5 |
| Molecular weight distribution (Mw/Mn) | 2.40 |
| Polymerization rate (%/hour) | 17.8 |

TABLE 7

|  | Comparative Example 6 | Comparative Example 7 |
|---|---|---|
| Radical scavenger | TEMPO | TEMPO |
| Concentration of radical scavenger C (mol %) | 1.33 × 10⁻² | 2.67 × 10⁻² |
| Polymerization temperature T (°C.) | 120 | 120 |
| 100 C. + 0.088T | 11.9 | 13.2 |
| Polymerization time (hour) | 3 | 30 |
| Polymerization conversion (%) | 30 | 90 |
| Weight-average molecular weight Mw (×10⁴) | 17 | 23 |
| Number-average molecular weight Mn (×10⁴) | 11 | 12 |
| Molecular weight distribution (Mw/Mn) | 1.55 | 1.91 |
| Polymerization rate (%/hour) | 10.0 | 3.0 |

We claim:

1. A radical polymerization process for producing a styrene base polymer, which comprises;
   (a) subjecting styrene or a styrene compound and a radical scavenger to thermal polymerization,
      (1) a concentration of the radical scavenger to styrene or the styrene compound being from $3.0 \times 10^{-3}$ to $5.0 \times 10^{-2}$ mol %, and
      (2) a polymerization temperature ranging from 100° C. to 140° C., provided that the concentration of the radical scavenger (C) and the polymerization temperature (T) satisfy the following formula, $$100C + 0.088T \leq 13.8 ,$$

and
   (b) continuing the polymerization to a polymerization conversion of from 40 to 85%.

2. A process according to claim 1, wherein styrene and the radical scavenger are subjected to the thermal polymerization.

3. A process according to claim 1, wherein a styrene compound selected from α-substituted styrenes and nuclear-substituted styrenes and the radical scavenger are subjected to the thermal polymerization.

4. A process according to claim 1, wherein the thermal polymerization is carried out in the presence of a compound copolymerizable with styrene or the styrene compound.

5. A process according to claim 1, wherein the radical scavenger is a member selected from 2,2,6,6-tetramethyl-1-piperidinyloxy, 4-amino-2,2,6,6-tetramethyl-1-piperidinyloxy, 4-hydroxy-2,2,6,6-tetramethyl-1-piperidinyloxy, 4-oxo-2,2,6,6-tetramethyl-1-piperidinyloxy, 4,4-dimethyl-3-oxazolinyloxy, 2,2,5,5-tetramethyl-1-pyrrolidinyloxy, phenyl-t-butyl nitroxide, and 2,2-di(4-t-octylphenyl)-1-picrylhydrazyl.

6. A process according to claim 1, wherein the thermal polymerization is carried out in a manner of a batchwise or continuous bulk process.

* * * * *